United States Patent
Bhanote

(10) Patent No.: US 8,838,536 B2
(45) Date of Patent: Sep. 16, 2014

(54) METHOD AND APPARATUS FOR MOBILE DATA COLLECTION AND MANAGEMENT

(76) Inventor: Sandeep Bhanote, South Plainfield, NJ (US)

(*) Notice: Subject to any disclaimer, the term of this patent is extended or adjusted under 35 U.S.C. 154(b) by 0 days.

(21) Appl. No.: 12/834,879

(22) Filed: Jul. 12, 2010

(65) Prior Publication Data

US 2011/0258345 A1 Oct. 20, 2011

Related U.S. Application Data

(63) Continuation-in-part of application No. 11/787,538, filed on Apr. 17, 2007, now Pat. No. 7,756,829.

(60) Provisional application No. 60/792,927, filed on Apr. 18, 2006.

(51) Int. Cl.
*G06F 17/30* (2006.01)

(52) U.S. Cl.
USPC ........................................ 707/621; 707/695

(58) Field of Classification Search
CPC .................. G06F 17/30575; G06F 17/30309; G06F 17/30023
USPC .................... 707/634, 610, 621, 695; 709/248
See application file for complete search history.

(56) References Cited

U.S. PATENT DOCUMENTS

| 8,046,424 | B2* | 10/2011 | Novik et al. | 709/216 |
| 2002/0010807 | A1* | 1/2002 | Multer et al. | 709/328 |
| 2004/0181467 | A1* | 9/2004 | Raiyani et al. | 705/28 |
| 2004/0254842 | A1* | 12/2004 | Kirkegaard | 705/22 |
| 2005/0004978 | A1* | 1/2005 | Reed et al. | 709/203 |
| 2006/0123010 | A1* | 6/2006 | Landry et al. | 707/705 |
| 2006/0143239 | A1* | 6/2006 | Battat et al. | 707/707 |
| 2006/0168259 | A1* | 7/2006 | Spilotro et al. | 709/229 |
| 2006/0282319 | A1* | 12/2006 | Maggio | 705/14 |
| 2007/0112714 | A1* | 5/2007 | Fairweather | 706/46 |
| 2009/0164604 | A1* | 6/2009 | Merissert-Coffinteres et al. | 709/218 |
| 2010/0153008 | A1* | 6/2010 | Schwartz et al. | 701/207 |
| 2010/0251230 | A1* | 9/2010 | O'Farrell et al. | 717/173 |

* cited by examiner

*Primary Examiner* — Robert Beausoliel, Jr.
*Assistant Examiner* — Alexandria Bromell
(74) *Attorney, Agent, or Firm* — John J. Skinner, Jr.

(57) ABSTRACT

A method and apparatus for a middleware approach to initializing and updating required data entry fields, pushing such required data entry fields to mobile devices and applications, collecting entered data from such mobile devices, and the synchronizing and integrating of the data is presented. A "form builder" software component of the present invention allows for the creation of easy to read and use data entry forms by company management. A "web application" software component of the present invention allows for the forms to then be distributed via electronic and/or wireless means to mobile client devices, such as PDA's, Tablets, and Laptops, and to Desktop computers. The mobile client devices run applications to utilize the data entry forms and are that into which collected data can be entered. A "synchronization server" software component of the present invention then allows for two-way communication, storage and conflict resolution (versioning) of the collected data. An "integration server" software component of the present invention allows for external access to the collected and versioned data and modeling/mapping of such data. Thus seamless data entry, collection, updating, conflict resolution, versioning, storage, access and utilization is available.

10 Claims, 13 Drawing Sheets

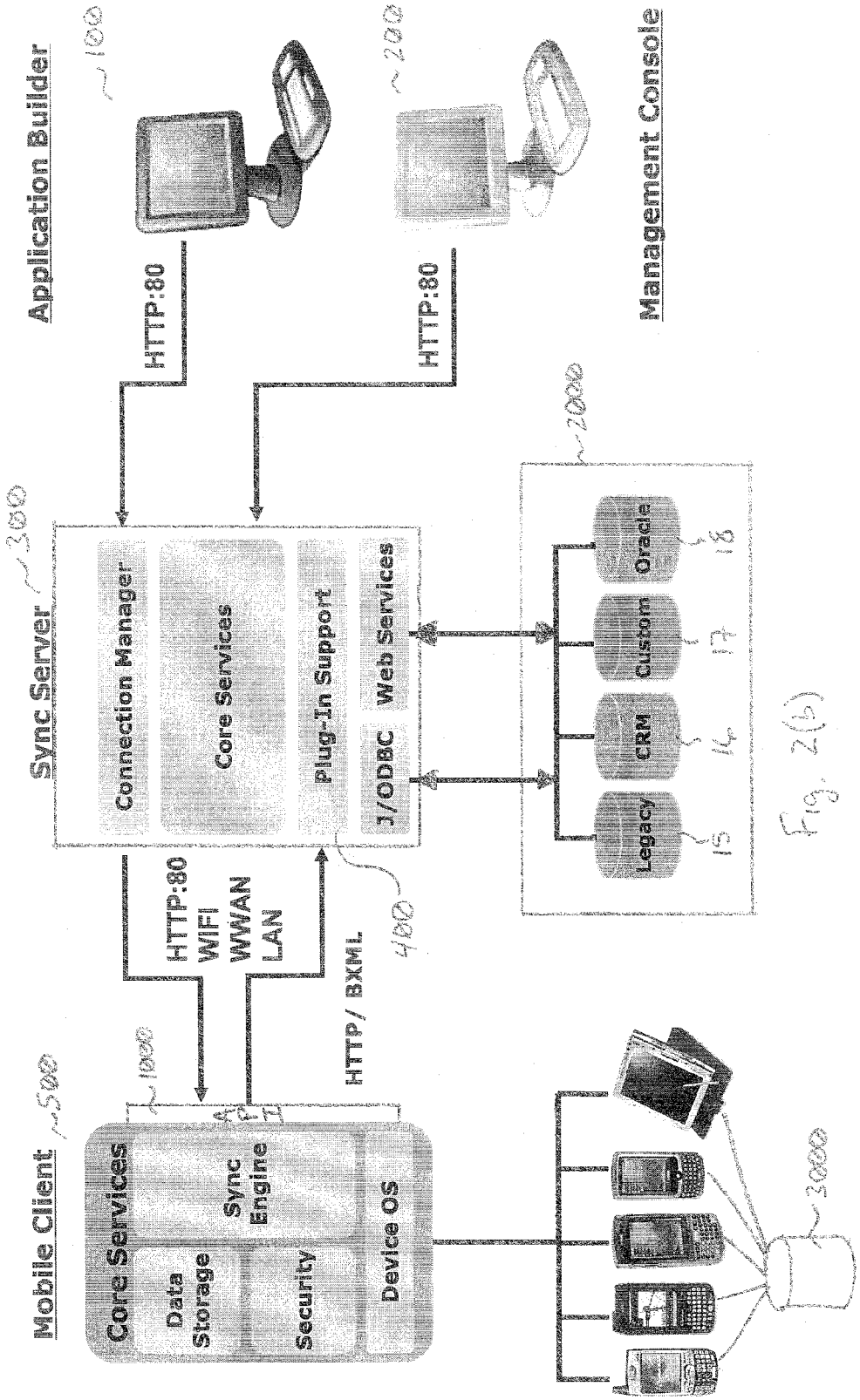

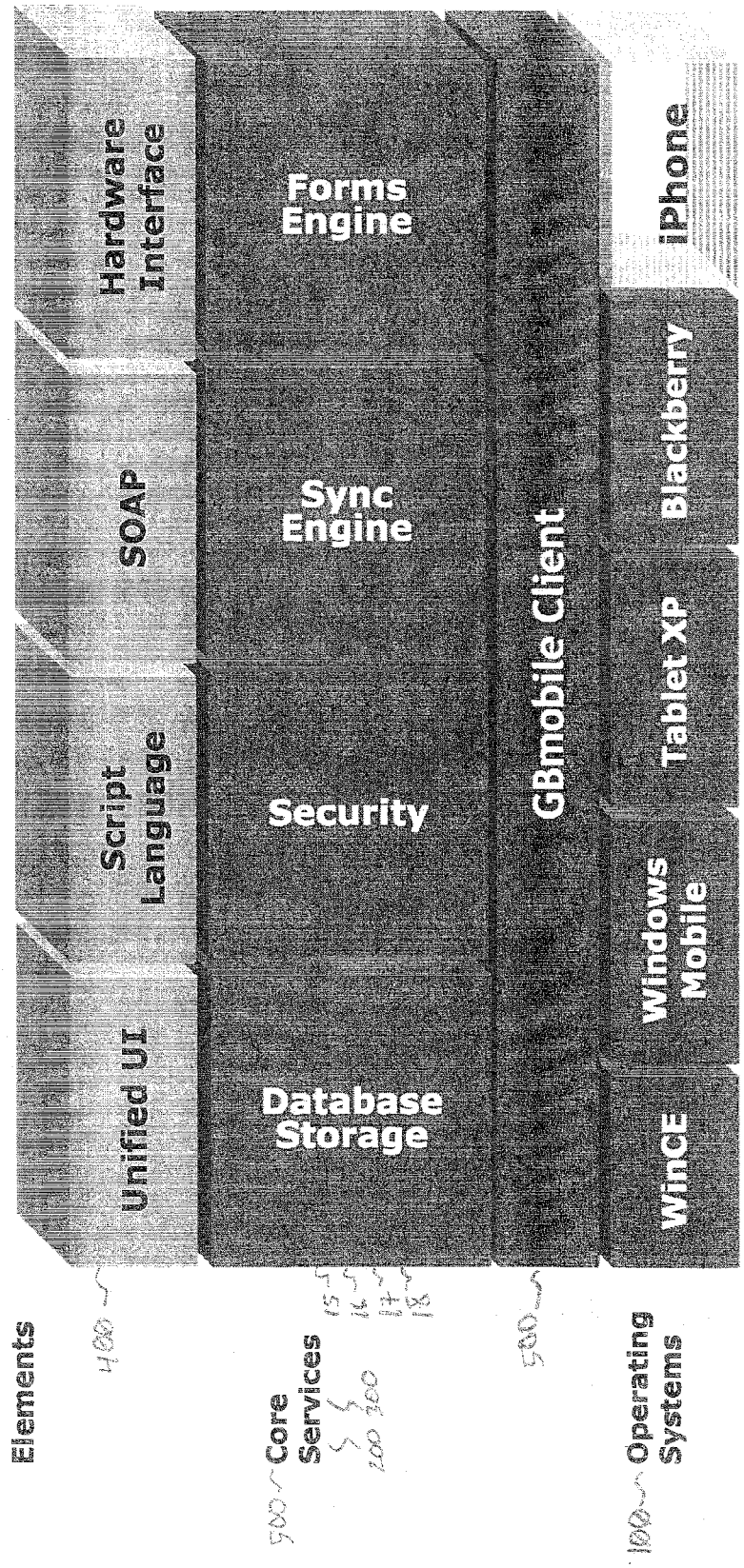

METHOD AND APPARATUS FOR MOBILE DATA COLLECTION AND MANAGEMENT

PRIOR PATENT APPLICATIONS

The present application claims the benefit of U.S. patent application Ser. No. 11/787,538 filed Apr. 17, 2007, which claims the benefit of U.S. Provisional Application No. 60/792,927 filed Apr. 18, 2006, the disclosures of each which are hereby incorporated by reference.

FIELD OF THE INVENTION

The present invention relates to a method and apparatus of utilizing electronic forms, surveys and applications for mobile devices and of the collection and management of the data thereafter, and, more particularly, to a method and apparatus for incorporating complex business rules in template forms, data entry surveys and applications, distributing such forms, surveys and applications, along with user specific content/data, via electronic means such as the internet or wireless communications, and the collection, synchronization and integration of the entered data.

BACKGROUND OF THE INVENTION

In a client/customer oriented world, servicing the client/customer through the efficient, timely and up-to-date collection and management of data is more important than ever. As organizations look for ever smaller edges over the competition, it is a must to increase their productivity in field data collection and analysis. One such edge can be had by the streamlining of the movement of client/customer data along with complex business rules, work flow and validations from the organizational enterprise to the field and vice versa. Being able to disseminate data or information efficiently are measurable ways to lower costs, increase revenues, optimize productivity and improve process management.

Accordingly, once an organization has decided to implement a new solution for their data collection and management needs, certain necessary factors need to be considered. While specific tools provided to organizations differ among the configurable mobile platform products, there is a standard set of criteria any mobile platform provider should be able to deliver. Some of these elements include:

A strong architecture and robust feature set that can deploy applications to a mobile taskforce quickly, that is in days/weeks rather than months/years.

The ability to create an organization's mobile application once and then deploy it to various mobile devices such as SmartPhones, PDAs or Tablets. This way the organization is never tied to one technology.

Implementation of a technology that is proven in the real world and can be rapidly deployed.

Solutions should be easy to use by both executives and non-professional workers. Thus, a low learning curve is necessary.

The ability to migrate all existing business rules/logic and validation from a backend system to the mobile application, therefore decreasing any learning curve and increasing productivity.

Many retail stores have specific backend systems in place upon which their technological hierarchy has been built. For instance, there are various types of mobile platforms to consider, synchronization of these various platforms, and data storage on various servers and databases. Clients also desire to have the backend systems integrated to the retail store side, and to have the ability to make custom reports that suit their business needs. Further, with an ever expanding stable of programs for various tasks, modules for data collection and management needs, flexibility and an ability for easy modification are a necessity.

Retail stores are now using mobile handheld checkout devices to assist their retail customers in a seamless and quick checkout process. These mobile device checkout devices allow a retail store clerk to enter data for a particular product into the handheld device which device then presents data corresponding to pricing, quantity and other data points for the particular product. Having such data readily available to the store clerk and the retail store customer facilitates the point of sale transaction, wherein the store clerk need only scan the product SKU, check the product information, swipe the credit card and print-out a receipt, all through the handheld point of sale mobile transaction device.

Having the aforementioned technology issues, and facing issues of integrating the data acquired at the mobile device to the stores backend retail purchasing and inventory systems, retail stores are looking for a middleware approach which can tie the various systems together and allow for both forward and backward data synchronization and storage, as well as the ability for ease of mobility and use of handheld devices serving the retail store's customers.

Thus as can be seen, issues and problems have arisen with the use of the current system architectures that need resolution.

SUMMARY OF THE INVENTION

Accordingly, the present invention is directed to providing a method and apparatus for a data collection and management system architecture that allows for data collection on a mobile device and synchronization of the data to back-end systems. Such is accomplished by the present invention by providing an end to end solution that puts the power of developing robust applications not only in the hands of the software developers, but in the hands of the business users as well.

The present invention allows the full life cycle, that is, the creation, deployment, management and data analysis of an application and all related business processes to be simplified through various components. Paper forms are converted into a configurable mobile application through utilization of the present invention's "form builder" component. The component has built in wizards that allow an end user to achieve the creation of applications that need sophisticated filters, logic, jump patterns and complex business rules without the knowledge of programming. Thus organizations can simply "configure" their mobile applications as opposed to having to "develop" them. This significantly lowers cost and risk associated with a point or custom solution.

Additionally, the present invention also allows mobile workers to collect data via the "mobile client" device component and to synchronize the collection of such data to the organization through the "synchronization server" component. In this manner then access to organizational data to and from the point of capture is allowed. It also allows the mobile worker to receive any kind of data (work history, schedule, reference material, alerts, etc) on the device from the enterprise, on demand or based on rules defined on the server.

Additionally, the present invention allows for external feeds from hardware attachments or hardware device features built into the mobile device (e.g., GPS, photo capture, barcode scanner and RFID) that, through the "integration server" component, can be integrated into the system.

The present invention, including its features and advantages, will become more apparent from the following detailed description with reference to the accompanying drawings.

BRIEF DESCRIPTION OF THE DRAWINGS

FIG. 2(b) is an illustration of an implementation of the communication architecture of a data collection/management network platform of a mobile data collection and management system, according to an embodiment of the present invention.

FIG. 3 is an illustration of a diagram of the technical software architecture of the synchronization server, integration server, mobile client and operating systems and elements of a mobile data collection and management system, according to an embodiment of the present invention.

DETAILED DESCRIPTION

FIGS. 1 through 12 illustrate a method and apparatus for a data collection and management system by which means template forms, data collection surveys and applications with complex business rules, along with user specific content/data, can be electronically created and distributed to mobile devices, and the data then collected and/or modified, stored, versioned, synchronized and managed.

Figure 1:
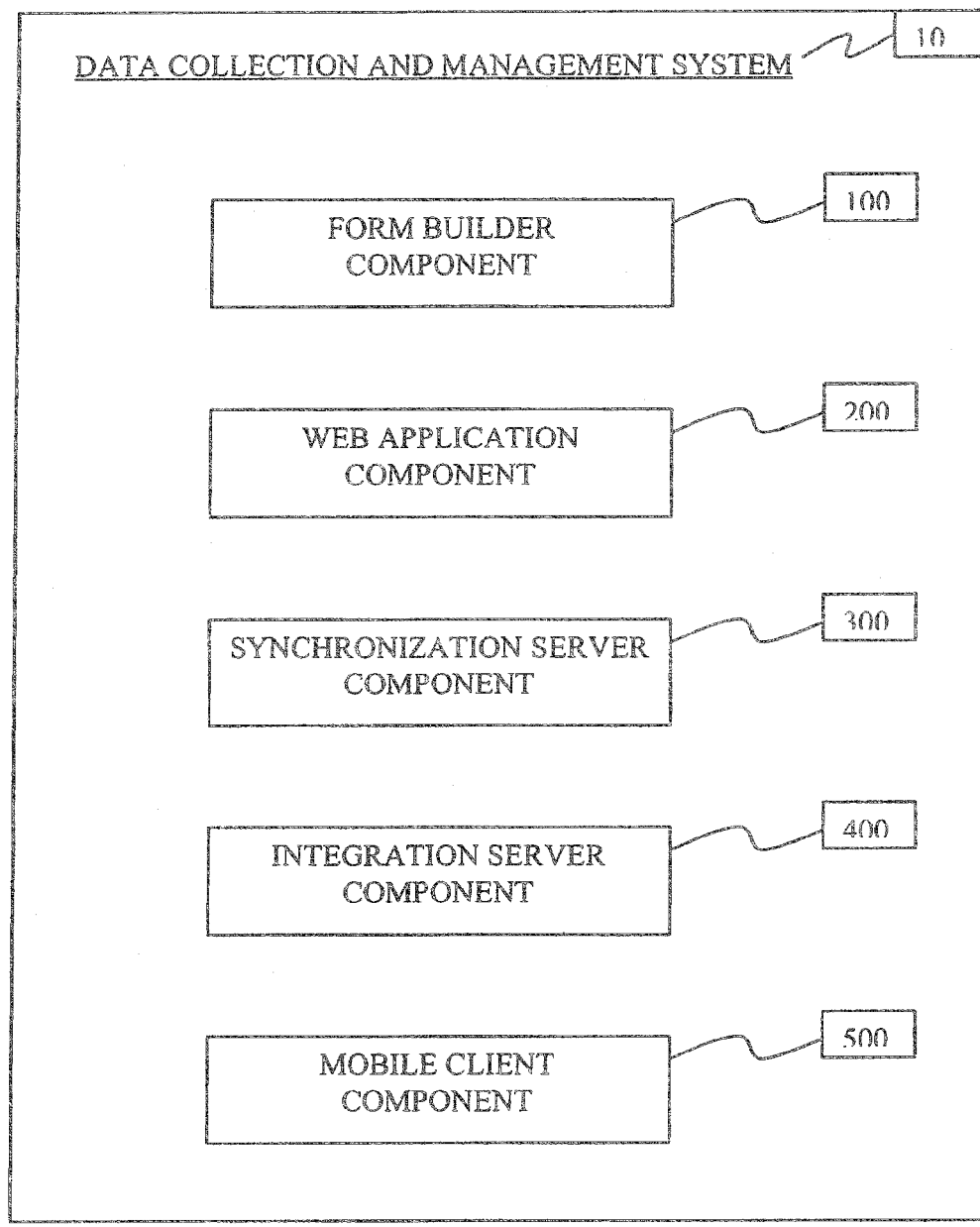
FIG. 1 is an illustration of an overview diagram of the various middleware components of a mobile data collection and management system, according to an embodiment of the present invention.

Referring now to FIG. 1, the present invention's end to end solution 10 consists of five main components, that is: a Form Builder 100, a Web Application 200, a Synchronization Server 300, an Integration Server 400 and a Mobile Client 500. These five components are interconnected but, depending on the function to be performed, all don't necessarily need to be used together in performing the system's functions. Each component will be discussed in detail below, but as a brief overview each has a general function of:

Form Builder 100: the form builder component allows for the creation of powerful forms/surveys/applications, retaining all business rules and validations, into which data can be entered;

Web Application 200: the web application allows for management of users, forms and data;

Synchronization Server 300: the synchronization server allows for a 2 way transport method as between the handheld devices in the field and the system itself;

Integration Server 400: the integration server allows for a 2 way transport method as between the system and any external data sources; and Mobile Client 500: the mobile client allows for collection of data on various handheld devices.

Figure 2A:
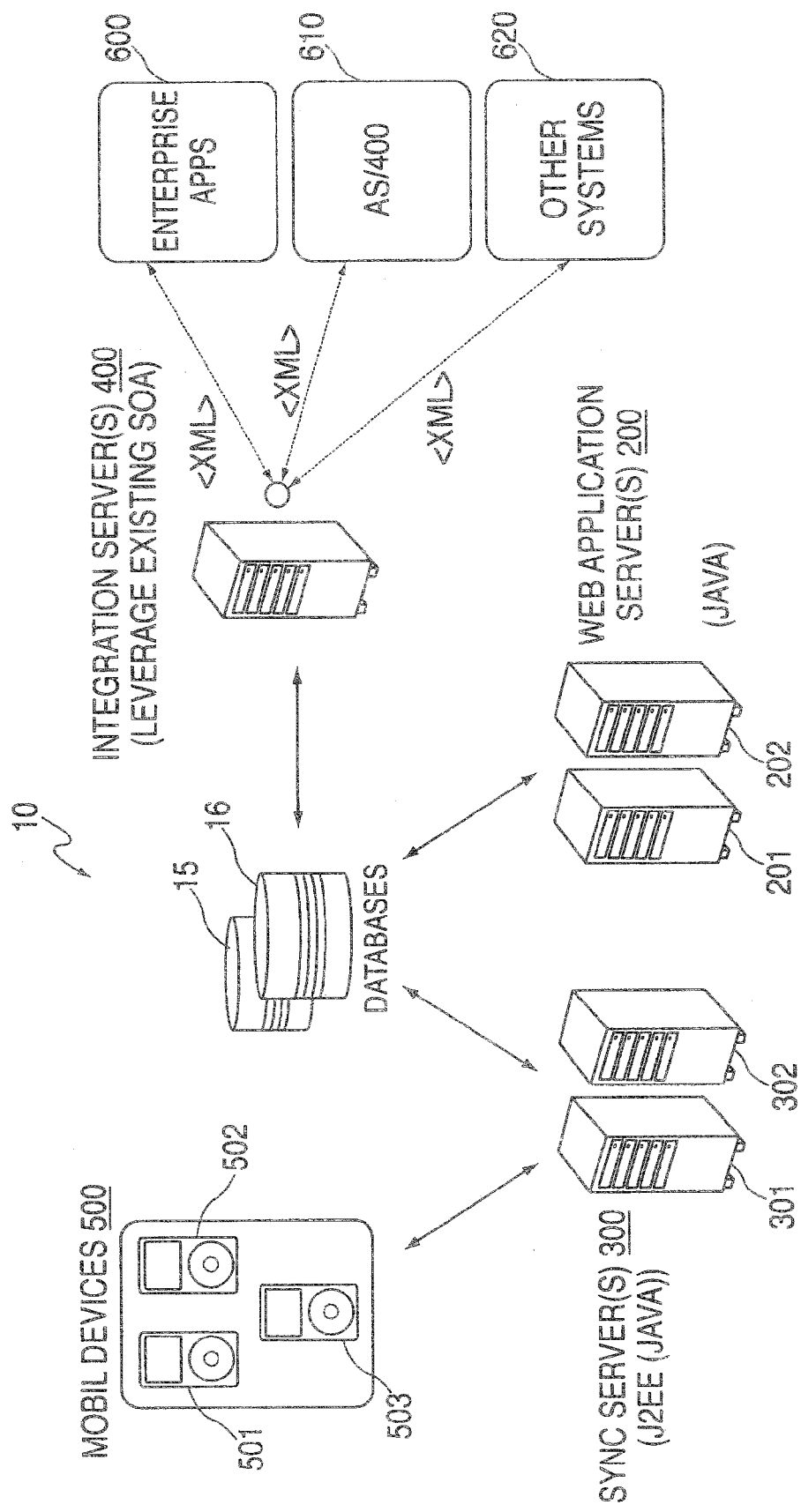
FIG. 2(a) is an illustration of an implementation hardware architecture of a data collection/management network platform of a mobile data collection and management system, according to an embodiment of the present invention.

Referring now to FIGS. 2(a), 2(b) and 3, the physical hardware implementation and software requirements for the system 10 are shown, respectively, according to embodiments of the present invention. Accordingly, regarding utilization of software, various parts of the platform of the present system 10, such as the Form Builder 100, Web Application 200, Synchronization Server 300, and the Integration Server 400 were developed using JAVA while the mobile client 500 was developed in C/C++.

A preferred embodiment of the Form Builder component 100 is run on a computer server having specifications of a CPU with a 1 G+speed, minimum RAM memory of 512 MB, hard disk drive space of 32 MB, and supports an operating system, such as Win 2000++ (excluding Win ME), or any operating system capable of running in a Java Runtime Environment (JRE) v1.4+. A preferred embodiment of the Mobile Client component 500 is supported on a Tablet XP or XP Professional (Windows 32 OS), Mobile Operating Systems (Win CE v4.1), Windows Mobile 5, and PocketPC 2002/2003. Additionally, the Mobile Client component can run communication components and supports peripheral and data collection devices via Bluetooth and WIFI. Preferably the development software tools used to create the dynamic applications and differing template forms, data collection surveys and applications can include: Borland JBuilder 2005, Sun Java SDK (v1.4), Visual Studio C++ (v7.1), and MS Embedded C++(v3.0 or 4.0). Accordingly, the Mobile Device applications are configurable and allow for change/add business rules in real-time.

Preferred embodiments of the Web Application component 200, Synchronization Server component 300 and Integration Server component 400 are any J2EE Application Servers (e.g., WebSphere, Tomcat, JBOSS), run in a JRE v1.4+, and have SQL Server 2000 SP3 security protocols. The servers are preferably capable of at least 500 simultaneous connections at 8 MB per connection, have a bus speed of 1.5 GHZ, and 512K RAM memory. It should be noted that each server is scalable as each has the ability to operate on both distributed and non-distributed processing models. Thus the system can supports additional servers (e.g., servers 201, 202, 301, and 302) with numerous simultaneous users.

With regard to the databases 15 and 16 (et. al), preferably the present invention uses it's own optimized databases which are based on a "Network Database Architecture". This method offers fast search capabilities, multiple queries, and storage of complex parent/child relationships. Preferably utilizing a PPC (133 MHZ Processor) that can retrieve at least 263 records per second (300 byte) or 10,000 records in 38 seconds. In addition, some key attributes of this model of data storage are that it allows for modeling of many-to-many relationships of the data, supports a multi-parent concept, and is a network model that is based on mathematical set theory. It is to be understood, however, that alternative storage support may be utilized.

In terms of implementation data transmission over the transport layer, data transport is handled using XML/SOAP and a BXML format that is compressed and encrypted to increase performance and minimize bandwidth usage. With regard to the security of the data, all transmissions from the System's servers to the client devices or vice versa is done over HTTP/HTTPS using BXML which compresses and encrypts the data to transfer it quickly, safely and securely. Thus in transit the data is both secured via https and in a binary format (i.e. unreadable to the naked eye). Preferably the underlying data is also encrypted/decrypted via blowfish 128 bit block cipher encryption and the LZ77 Deflation compression algorithm. Thus even if broken the underlying data is in a format that would render it useless, thereby providing end-to-end security.

With regard to the communication architecture, the architecture can operate in two modes, that is a managed mode and a non-managed mode. In the managed mode, the form builder component 100 and web application component 200 are utilized as described herein. In the non-managed mode, these components are not utilized.

Instead, in the non-managed mode, there are two methods by which the non-managed mode works. The methods are the "proxy pass-through" method and the "proxy pass-through with data sync" method.

With the "proxy pass-through" method, a retail customer uses API 1000 which is embedded into the retail customer's existing code base on mobile device 500. In such manner, API 1000 is instructed to communicate with sync server 300. The sync server 300 in return receives any communication requests and processes it through integration component 400. Integration component 400 takes the initial request sent by mobile device 500 and redirects it to the appropriate back-end database of the customer system 2000.

In certain instances, the initial request that is communicated to the customer system 2000 prompts a response from the customer system 2000 (i.e., where the initial request requests a response). Then that response is communicated from customer system 2000 to Integration component 400, which response then gets processed by synch server 300, which response then gets communicated back to API 1000, which response then gets displayed onto the mobile device 500.

For example, where the mobile device 500 is utilized in a price checking capacity, a bar code SKU number on a piece of clothing is scanned by the mobile device. The SKU number is sent to the sync server 400 by the API 1000. At the sync server 400 the integration component 400 takes that SKU number component and sends a request to the appropriate back-end customer system 2000. Customer system 2000 recognizes a price for that SKU number and then communicates that price back to integration component 300 in sync server 400. The response is communicated back to API 1000, which displays a value of the piece of clothing on mobile device 500.

With the "proxy pass-through with data sync" method, the architecture need not have connectivity at all times between the mobile device 500 and the sync server 400 in order to function. Instead data is synchronized from the customer system 2000 onto the mobile device 500 utilizing memory 3000. Memory 3000 is resident on the mobile device 500. This architecture allows for either one-way or bidirectional synchronization. One-way synchronization downloads data from customer system 2000 to mobile device 500 with the expectation that the data source will always be customer system 2000. Bidirectional synchronization, on the other hand, downloads data from customer system 2000 onto the mobile device 500, but has changes made to that data and then synchronizes it back to customer system 2000.

For example, in inventory management a retail store receives an inventory request from headquarters. Such request is downloaded into the device (e.g., listing the inventory to be counted), and upon taking of inventory by scan, a list of purchases that should exist is modeled by the data and sent back to headquarters.

Referring now specifically to FIG. 2(b), integration component 400 has been coupled with synchronization server 300 to be a little more fluid in operation. Such is accomplished when sync server 300 receives a request from the mobile client 500, the mobile client 500 instructs sync server 300 to use a specific integration server component 400. A part of the communication then instructs as to which specific integration component 400 should be utilized for integration operation.

Returning to the price check example, mobile client 500 communicate with sync server 300 by sending a value data point, such as a SKU bar code scan, and, in addition to that value data point, also specifies which integration component 300 should process that SKU bar code scan. The integration component 400 is prebuilt to accept commands or data requests from the mobile component 500, having a code to communicate to the customer system 2000 to communicate the value data point with an expectation that a response will be forthcoming with information on that value data point, such as price and description of product. Such information then gets sent back to mobile device 500.

Figure 4:
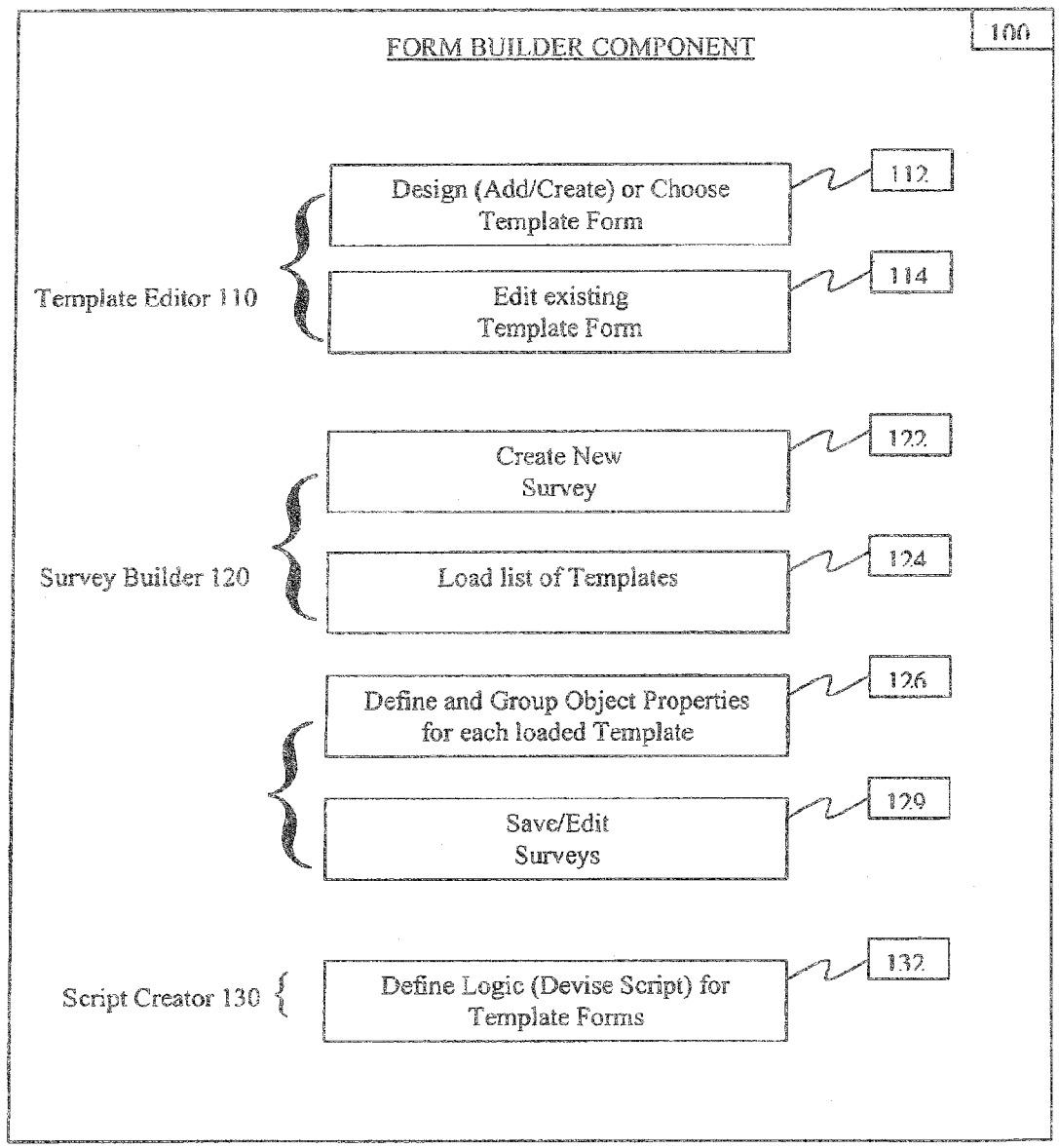
FIG. 4 is an illustration of a methodology by which forms, surveys and/or applications may be constructed within the "form builder" component of a mobile data collection and management system, according to an embodiment of the present invention.

Referring now to FIG. 4, the Form Builder component 100 is the tool that is used to create the template forms, data collection surveys and business rule applications that are run on the Mobile Client component 500 and subsequently managed through the Web Application component 200. The Form Builder is designed to be user-friendly and allows authorized users (e.g., IT or business users) the ability to design, develop, edit and deploy handheld forms, surveys and applications.

In other words, the form builder's user interface and menu driven structure support the development and updating of forms/surveys/applications that utilize sophisticated scripting and business logic, by the business unit or internal IT resources. A key benefit of this design is the ability to selfmaintain the system and deploy new forms and changes more rapidly without reliance on outside programmers. Another key benefit of this design is the ability to maintain processes defined by a business at the application level on the mobile client, thus eliminating the need for long training sessions and additional resources needed for references, and therefore improving the quality of the data pushed to the enterprise.

The Form Builder component 100 comprises three operative interface pieces, that is, the Template Editor 110, the Survey Builder 120, and the Script Creator 130. The vast majority of forms are thus created using these interface pieces. It is to be understood that each of the three operative interface pieces may be utilized together or separately, and indeed, in so being utilized separately are therefore to be considered as independent one from the other.

In steps 112 and 114, the first operative interface piece, the Template Editor 110, allows a system user to, respectively, design or choose a template form or edit an existing template form. The Template Editor is a full Graphic User Interface (GUI) development environment for editing/building forms. The system user selects the "Templates" tab to expand and present a list of template forms that are already populating the Template Editor 110. The list may be categorized into groups. The template forms may be loaded in to the survey creation tree by double clicking.

As is further shown in FIG. 4, the second operative interface piece, the Survey Builder 120, allows a system user, in step 122, to create a new survey. The system user fills in a name for the respective survey they wish to create.

Alternatively to, or in conjunction with, loading a template form, a system user may load a dataset. A dataset is a list of questions that the system user can use in order to create a new survey.

When a system user desires to create a survey utilizing a dataset there are attributes that need to be provided. Dataset questions in the "Data Tree" represent questions with predetermined answer choices. A child dataset may be required depending on the structure and nature of the survey being created. The parent dataset is one level higher and directly associated with one or more children. A child dataset is on the dependent side of a hierarchical relationship where the parent would be on the controlling side. The child dataset is one level lower and must have one parent. Creating a child dataset requires the same process as creating a parent dataset.

If the system user so desires, in step 124 in conjunction with the above or again yet alternatively the system user may load a list of stored templates for use in the newly created survey. Utilizing each of these interface pieces, questions and data inputs for the field users are created (all from drop down GUI interfaces) for the forms. Accordingly, as has been show, questions can be made mandatory and answer choices can be pre-populated to minimize user error.

The Survey Builder 120 further allows a system user, in step 126, to define and group object properties for each loaded survey and/or template form. Thus, specific properties and validations for the surveys/forms can be set. In addition, incorrect data entry error messages can be defined, font sizes and colors can be determined, graphics can be inserted, screen objects aligned, etc. For ease of use the screen designer is a drag and drop interface. Also in addition, the present invention supports various question types and "look and feel" controls (such as scroll bars and tab driven interfaces), as well as user friendly form and data element selection features (such as drop down lists, radio buttons, check boxes, text area for open ended questions), graphical drawings, signature captures, and numeric entry.

The Survey Builder 120 also further allows the system user, in step 129, to save and, if so desired, further edit the form. Selecting to save the form would save the application in a bxml format within the database on the server (as further described below). A form preview screen then allows the system user to preview what the form(s) will look like on mobile devices before it is provisioned to the field. This has the practical effect of enabling better QA testing and design of the forms.

As is further shown in FIG. 4, the third operative interface piece of the Form Builder component 100, the Script Creator 130, allows the system user to manually script advanced logic into the form if the need arises. The Script Creator 130 is a script wizard for implementing sophisticated logic (e.g., scoring logic, field verification, etc.) allowing for significant functionality and flexibility to be generated automatically. Thus, referring back to FIG. 4, in step 132 the system user can operatively define logic (i.e., devise script) for the template forms or data collection surveys. The wizard operates by system user input and decision making along a series of steps via GUI based functionality. Such allows for a non technical user to create complex logic, manipulate control properties (i.e. font, color, size, etc.), set validations, filter lists, define jumps, define data save points, populate controls with value, etc., without ever having to write a single line of code. For the more technical user scripting can also be implemented directly. Accordingly, Script Creator 130 allows for complete customization of forms and much more advanced logic.

Together the three operative interface pieces of the Form Builder component 100 allow the system user to develop and deploy much more than a simple template or data collection survey, and instead, system users can create comprehensive applications based on complex business processes.

Figure 5:
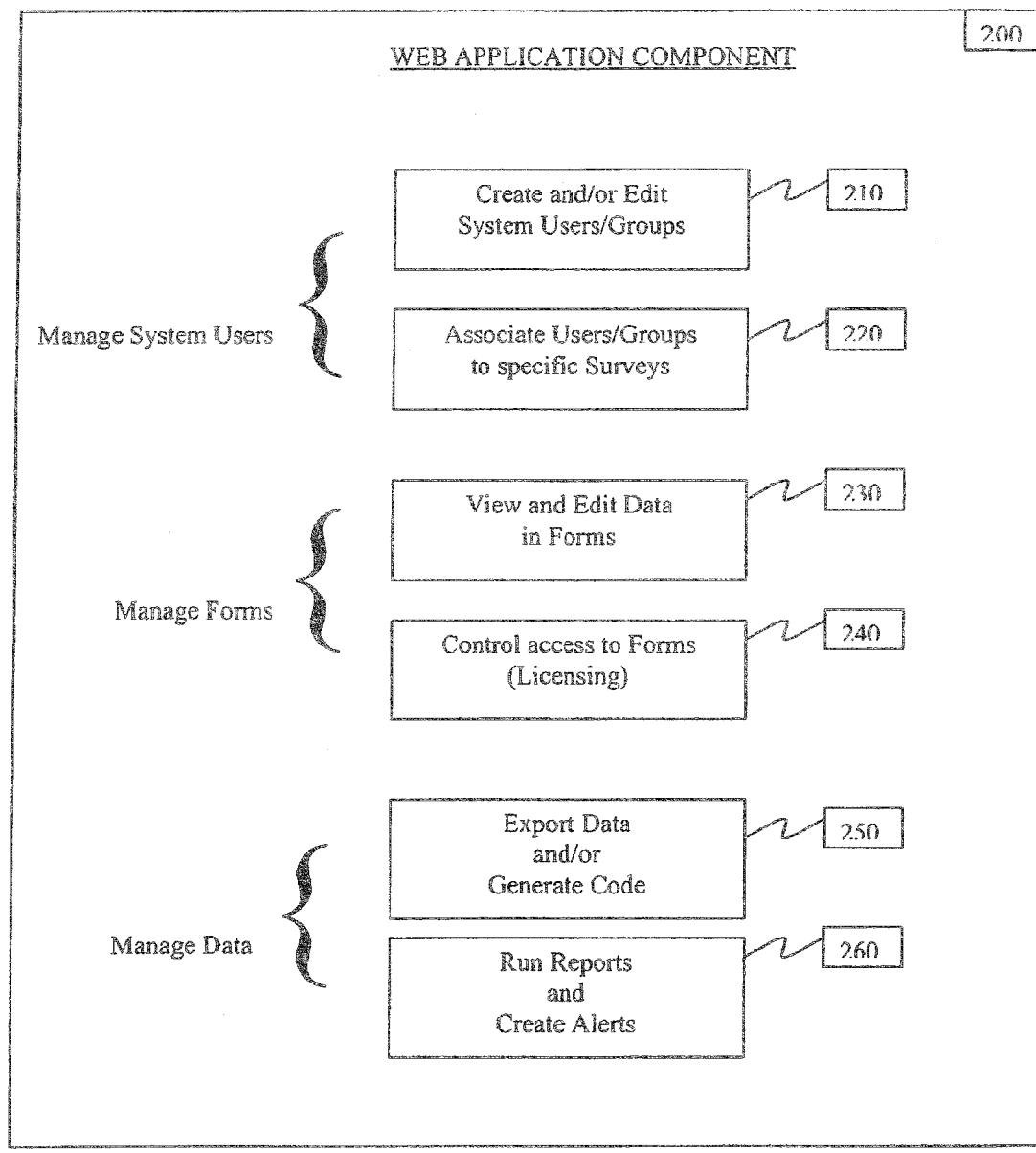
FIG. 5 is an illustration of a methodology by which management of the created, distributed and collected forms, surveys and/or applications can be accomplished via electronic means with the "web application" component of a mobile data collection and management system, according to an embodiment of the present invention.

Referring now to FIG. 5, the Web Application component 200 is the computer software application that allows system users to access the System 10. The Web Application runs on any J2EE compliant application server such as, for example, Apache Tomcat. This enables the present invention Web Application to be platform-independent.

As is shown in the Figure, the present invention's Web Application component grants administrators three separate management abilities, that is, allowing administrators to manage the system users, manage the forms, surveys and applications in the systems database, and manage the collected data. As is detailed in the following paragraphs, this allows for form/survey/application creation and design management, distribution management, and management reporting through an intuitive and easy-to-use web interface.

In allowing management of system users, in step 210, a system administrator can create and/or edit system users and/or groups, and in step 220, a system administrator can associate users and/or groups to specific forms, surveys or applications. In allowing management of the forms/surveys/applications in the systems database, in step 230, the system administrator can view and selectively edit data fields in the forms, and in step 240, can control who is able to access the forms. The system administrator can then choose the appropriate survey to view and edit. In this manner then, the system administrator can retain control over what data needs to be entered by the field users, control internal access, and implement, if so desired, a licensing program to control external access.

In allowing management of the data, in step 250, data can be exported, for instance into MS Excel, and in step 260, reports and/or queries can be run against the data that has so far been collected in the field. There are three types of reports that a system administrator can run, that is, Tabular, Linear and Summary Reports. The Tabular Report allows the system administrator to select fields (questions) from the survey that is chosen and then display the data collected in a tabular (line list) format. The Linear Report shows data as a set of elementary (linear) records, which can be sorted by any field. The Summary Report details are displayed in a summarized format allowing the system administrator to group the data by certain fields. In this manner then, the system administrator can effectively manage the data collected.

Thus, as can be seen, the Web Application component 200 allows system end-users to access their data, create queries, develop and design reports and export data without intervention by IT staff. Access to these functions can be limited based on user rights and is managed within the Web Application.

Figure 6:
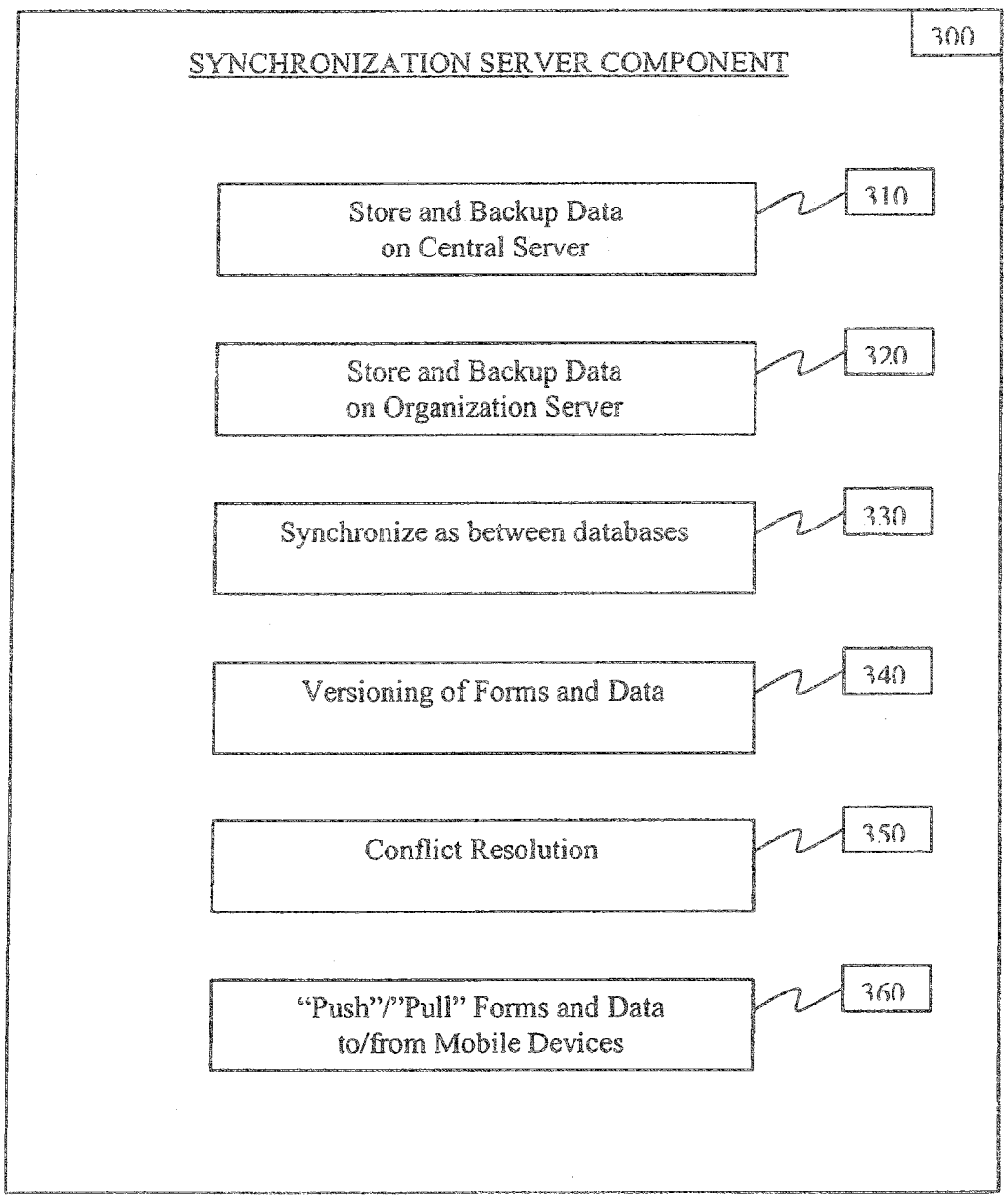
FIG. 6 is an illustration of a methodology by which data transmission, data collection conflict resolution, form, survey and/or application versioning, and storage of the collected data occurs as performed by the "synchronization server" component of a mobile data collection and management system, according to an embodiment of the present invention.

Referring now to FIG. 6, the Synchronization Server component 300 is the computer hardware/software that allows for control of the secure and efficient transmission and storage of data, forms and surveys as between the various other components of the mobile data collection and management system 10. The Synchronization Server component 300 also, as a primary feature, allows synchronization between the mobile devices of the Mobile Client component 500 and the architecture's database 15, and re-transmission support such that if data was not synchronized the transmission is not lost and but is sent on next synchronization. The Synchronization Server component can be managed through a management console application which offers full management and configuration of the server.

The first feature of the Synchronization Server component 300 is, in steps 310 and 320 respectively, the control of storing and backing-up data on a central server database 20 and on a organization's server database 21. As an additional feature, in step 330, the Synchronization Server component 300 will synchronize the data, forms and surveys stored as between the various databases.

Additionally, in step 340, data versioning of forms and data collected from the mobile devices is accomplished and controlled by the Synchronization Server component 300. Each time data is entered and each time a form is saved, new versions are saved. This is accomplished by storing such versions of the form and data therein entered under different version numbers. Thus during the life cycle of form modifications and data entry, the initial data model that was created is kept intact. If, for example, a particular question is removed from the form/survey, the question is removed from the form/survey, but not from the data model (i.e., the original or latest version). In this way then, a system user may still access data that is no longer being reported on in the field by the mobile devices.

In response to the ability to version forms and collected data, the Synchronization Server component 300 also, in step 350, conducts conflict resolution. The need for conflict resolution can occur if and when data collected from the field is incongruous for or outside the scope of the intended form/survey, or such data collected as between mobile clients is inconsistent or out-of-date.

As mentioned above, a primary feature as shown in step 360 is the synchronization of data, forms and surveys, business rules and validation to and from the mobile devices of the Mobile Client component 500. Such synchronization is 2-way synchronization, that is, data is pulled from the device and data is pushed to the device. In other words, data not only goes from device to server but vice versa as well. In addition updates of the forms and/or surveys are pushed to the mobile device. Such updating can be system wide or selective in that data can be "pushed" to a mobile device on a user specific basis.

Figure 7:
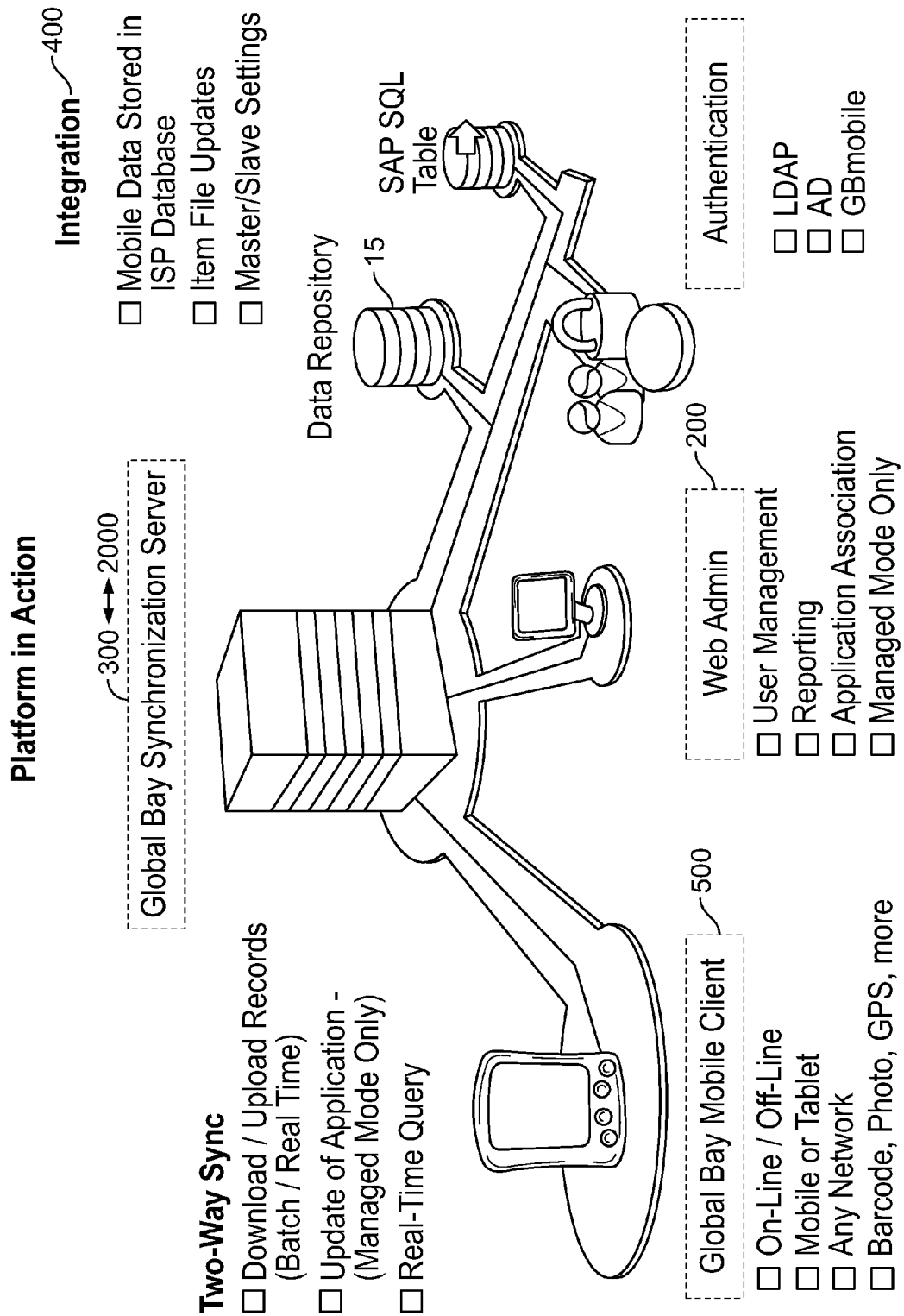
FIG. 7 is an illustration of a model of the platform architecture during a synchronization action as carried out by the "synchronization server" component of a mobile data collection and management system, according to an embodiment of the present invention.

Referring now to FIG. 7, an exemplary synchronization controlled by the mobile data collection and management system architecture's Synchronization Server component 300 is shown in conjunction with central and organizational servers. In this example, it is shown that there can be multiple servers 301, 302, 303 and 304, each having an independent database 15, 16, 17 and 18. Thus it is to be understood that the Synchronization Server has scalability in that there can be Primary and Secondary Sync Servers. In addition in this example, it is shown that additional components, such as mobile device 500, central server 20, organization's server 21 and a 3rd party application/system can be synchronized. Thus it is to be understood that the system can support both distributed and non-distributed computing models.

Synchronization occurs by and between each of the multiple servers 301, 302, 303 and 304 and then to each of the other components. Once data has successfully reached the mobile client it is kept in a secure manner by compressing and encrypting. For example, an encryption algorithm that can be used is a Blowfish 128-bit block cipher encryption, and a data compression that can be used is the zLib compression method (i.e., a variant of the LZ77, called deflation, which emits compressed data as a sequence of blocks). Such is done to ensure that data is transmitted securely without information loss between the present invention's Server 300 and the present invention's Mobile Client 500. In addition, there is an option to "Smart-Sync", that is synchronize only deltas from records. Such option allows for a reduction in the amount of data traffic.

Figure 8:
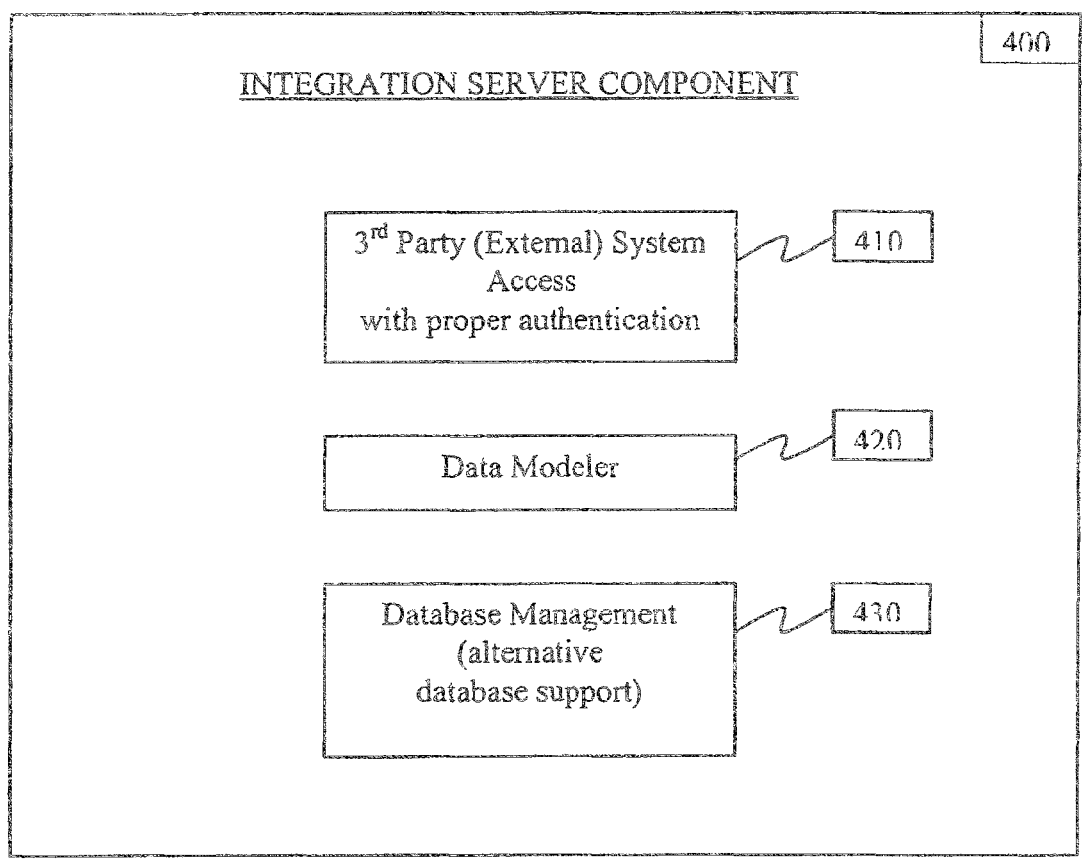
FIG. 8 is an illustration of a methodology by which external access to the collected and versioned data and modeling/mapping of such data occurs as performed by the "integration server" component of a mobile data collection and management system, according to an embodiment of the present invention.

Referring now to FIG. 8, the Integration Server component 400 allows external systems to access and share the data that is stored in the mobile data collection and management system architecture 10 of the present invention. The "engine" of the "integration server" includes a proprietary Database Management System (DBMS—not shown) that stores all data collected from the mobile devices in the field. The DBMS uses Java Database Connectivity technology and a standard SQL database access interface, enabling it in step 410 to be compatible with third party applications and existing infrastructure. Thus the Integration Server component 400 allows for data, business rules, validations and user interfaces to be "Pushed" and "Pulled" into the system by 3rd party systems. This is done through XML messages over HTTP. All data accesses require proper authentication and correct acknowledgment to exchange data. All messages are transactional to ensure data integrity.

In step 420, the mobile data collection and management system architecture 10 of the present invention includes a data modeler. The data modeler allows a user to map fields between an external system/database and data fields within the present invention's mobile data collection and management system architecture. Thus, after the connection is established, the 3rd party system user will be able to view the different databases/tables/fields that are available. The Data Modeler also allows creation of a link between the present invention and an external system and supports two modes: 1. the present invention to external system and 2. external system to the present invention.

Once the fields have been mapped between the external system and the present invention using the Data Modeler, the mobile data collection and management system architecture of the present invention then processes and understands the external system database tables and it's relationships. Next the present invention creates the same tables within the present invention and is then ready to use by the Form Builder.

Finally, the user can create applications based on the tables of the external system. All functionality can be done without writing any line of code.

Lastly, in step 430, the Integration Server component 400 also includes an alternative database support for further backend integration and support for XML feeds and other data outputs for advanced reporting and application integration.

Figure 9:
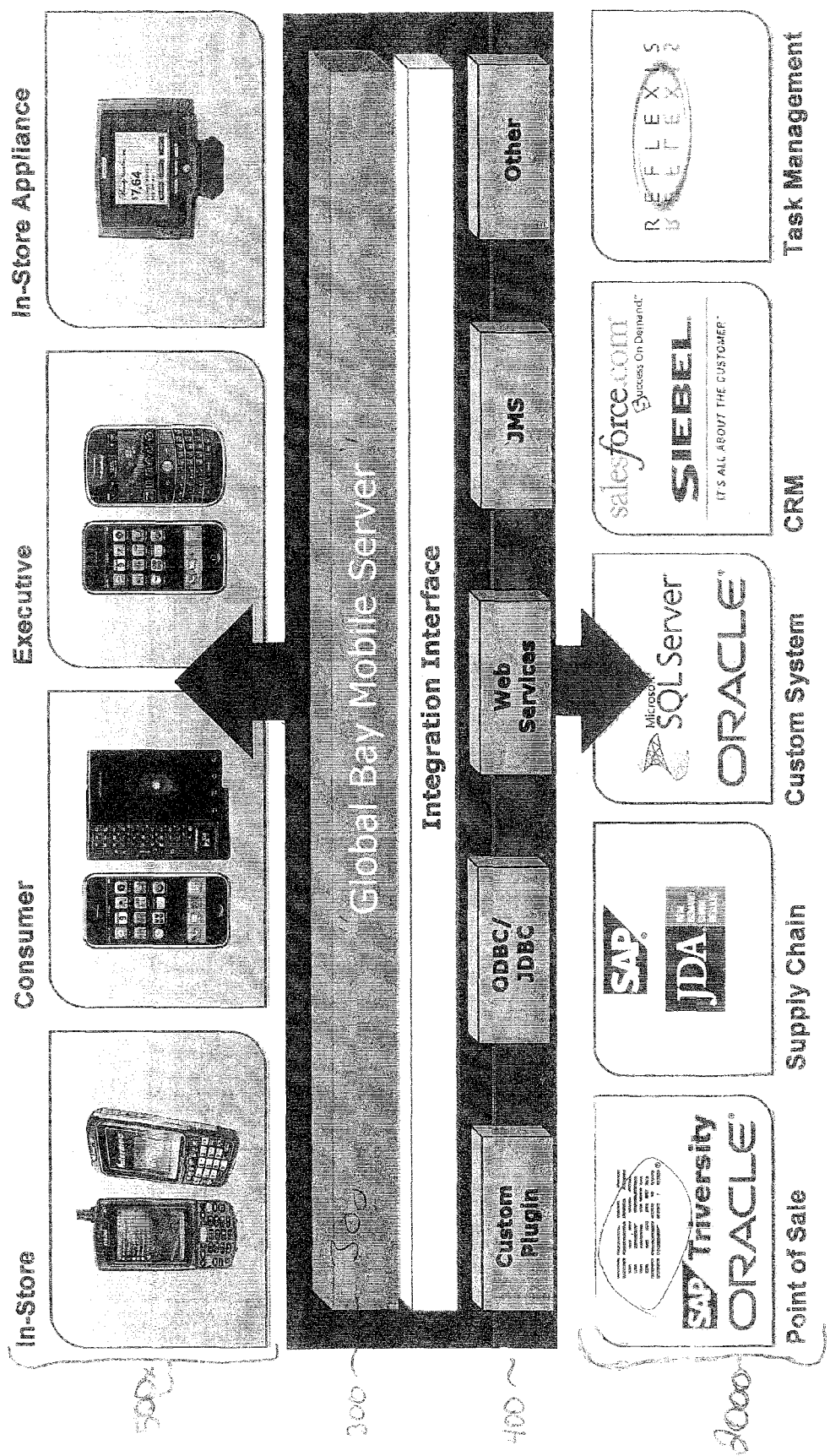
FIG. 9 is an illustration of a methodology by which the present invention delivers specific applications from the data collection and management system to the customer systems, according to an embodiment of the present invention.
Figure 10:
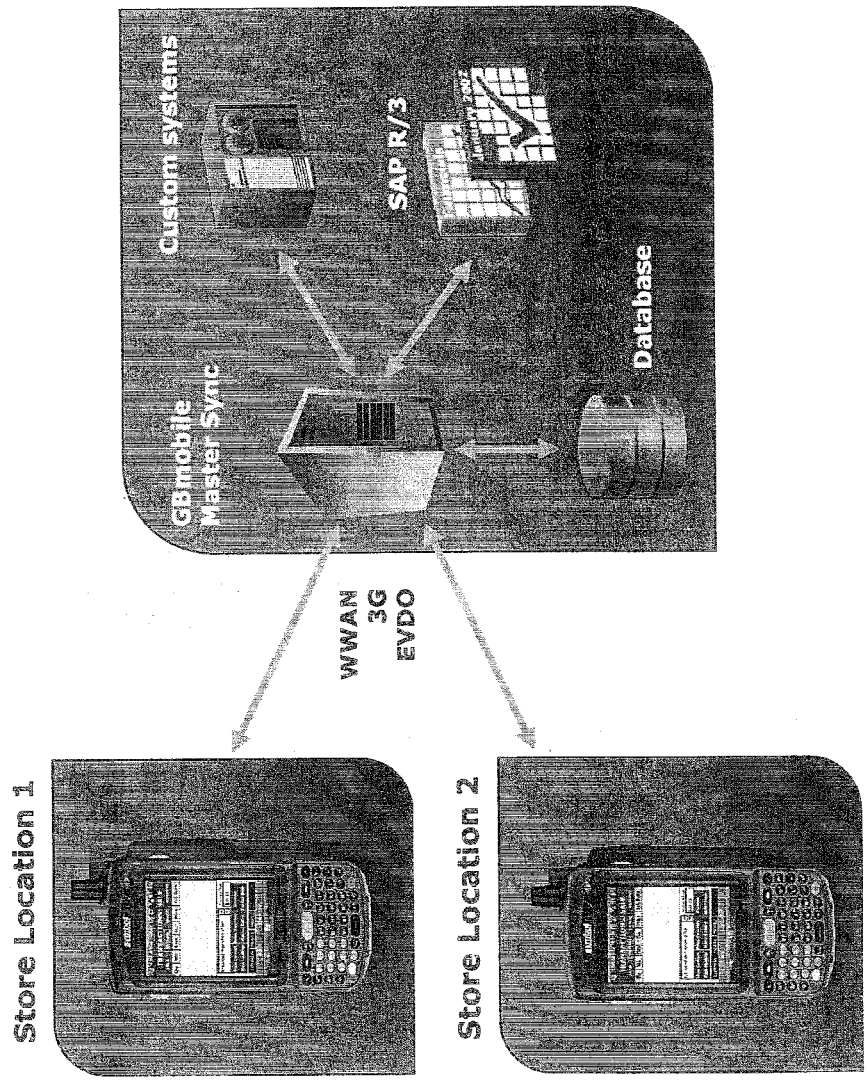
FIG. 10 is an illustration of a model of a centralized deployment of the implementation of the hardware architecture of a data collection/management network platform of a mobile data collection and management system, according to an embodiment of the present invention.
Figure 11:
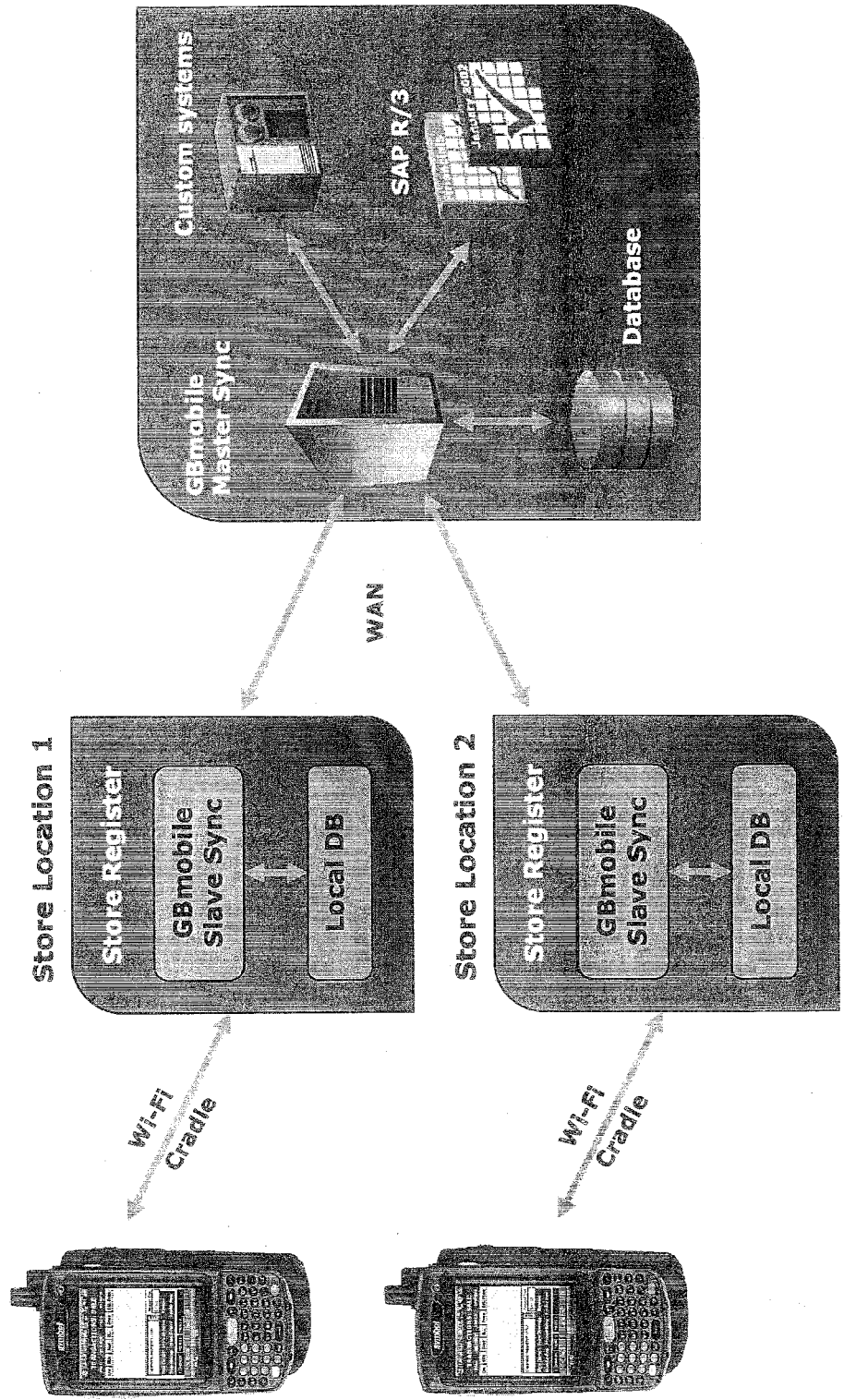
FIG. 11 is an illustration of a model of a distributed deployment of the hardware architecture of a collection/management network platform of a mobile data collection and management system, according to an embodiment of the present invention.

Referring back to FIGS. 1 and 2 and additionally now to FIG. 9, the Mobile Client component 500 comprises individual mobile devices 501, 502, 503, 510 and 520 and the mobile software applications that resides on such devices. The mobile devices can be any device on which an application that has been authored by the Form Builder component 100 can be run (i.e., devices such as a PDA, a Desktop, a Tablet, etc.). As mentioned, a Mobile Client software application that is capable of supporting the Form Builder component application is resident on each mobile device. Such placement allows for leveraging both data collection on a mobile basis at the device and management of data, forms and surveys through the system architecture's virtual machine technology. In this manner then cross-platform support and compatibility for all solutions deployed on the system is attainable.

Referring now specifically to FIG. 9, a row of mobile and fixed devices 500x which are in-store devices, consumer devices, executive devices and in-store appliances. Mobile and fixed devices 500x communicate to the synch server 300 and integration component 400. The functionality of synch server 300 and integration component 400 is such that they act as a single point of integration. The modules allow a customer to integrate or extract data from customer system 2000 by utilizing the synch server 300 and integration component 400 to leverage business rules so that mobile device 500 can take advantage of these systems to perform specific tasks either in the store or outside the store.

Figure 12:
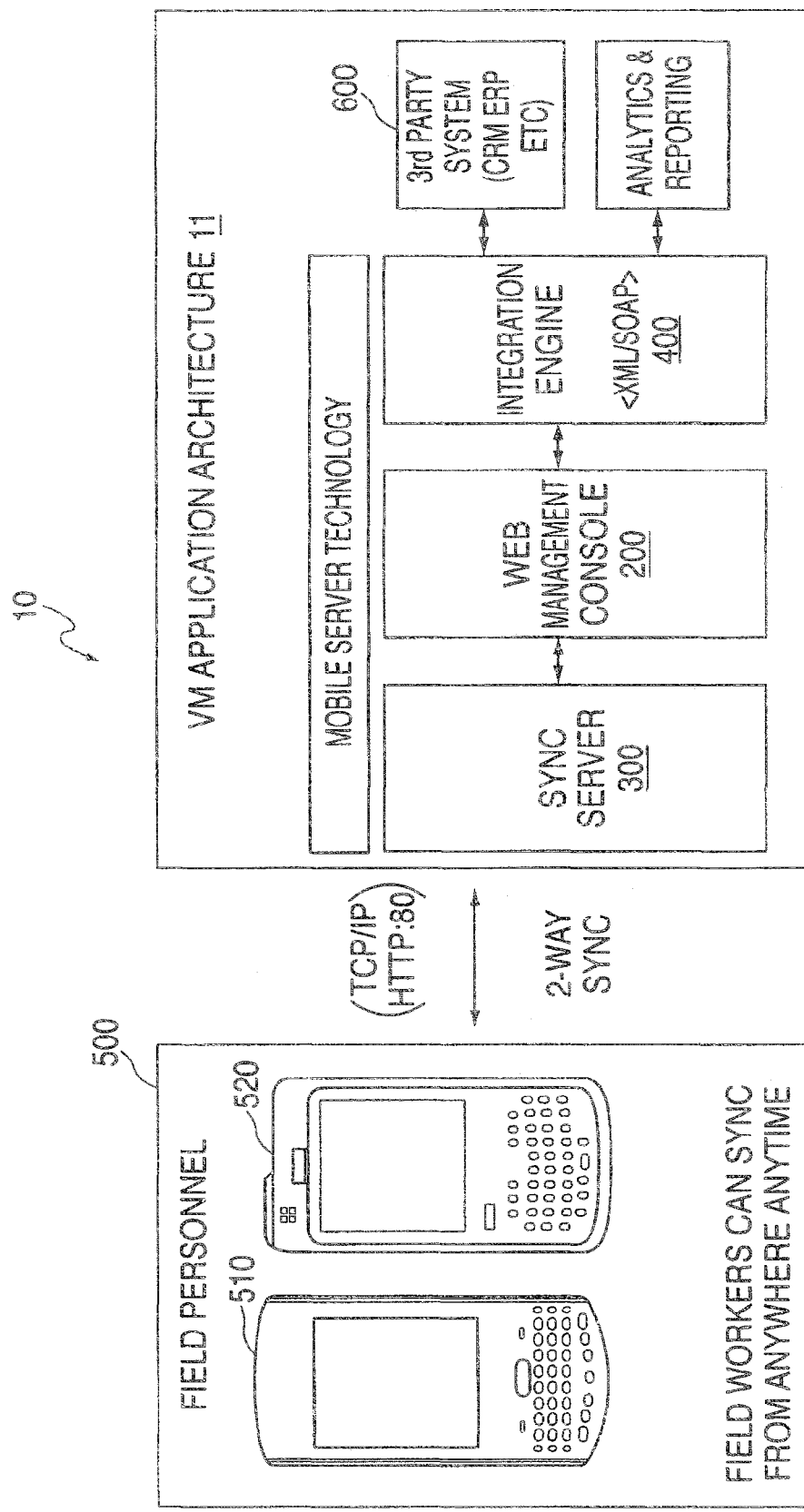
FIG. 12 is an illustration of an example of the middleware application architecture of a mobile data collection and management system, according to an embodiment of the present invention.

Referring now specifically to FIG. 12, an example of the middleware application architecture of a mobile data collection and management system 10 and its utilization is shown. The present's invention's middleware, as it has been written in the computer software language of C++, allows implementation of a Virtual Machine (VM) architecture 11. The applications of VM 11 are deployed independently of each other and those needed to make a mobile solution work and thus can be stored on independent computer servers and/or databases (not shown). Thus, in this implementation example, the Form Builder component, or mobile server technology 100, resides independently of the mobile devices 510 and 520 of the mobile client component 500. Updates of the server technology or synchronization of the data collected by the field personnel is directed by the synchronization server component 300. Control over when synchronization occurs comes from input by the system management through the web management console 200. Access by 3.sup.rd Party Systems 600 to and the capability to run analytics and reports of the data stored by the system 10 is via the Integration Engine Server 400.

With regard to security of the system 10, both the Synchronization Server component 300 and the Integration Server component 400 require proper authentication against a users access to a database and such authentication must correctly acknowledge each request.

In addition system and database access can be established and controlled for individuals and groups through an interlocking system of roles and privileges. Role-based access to build, edit, change forms, deploy and manage users and access to other tools and functionality can be determined by the individual's role. Unnecessary options can be hidden from the system user, greatly simplifying the present invention's use and over the data collection process.

Also in addition, administration and security control can be established and distributed such that individual and group Web authoring relies upon a unique tiered security system consisting of site administrators, departmental administrators and individual content creators. This functionality allows for effective distribution and management of security privileges.

Thus as can be seen from the above description, the present invention facilitates development and solutions to a wide variety of concerns and obstacles to the introduction of mobile applications today. The present invention accomplishes the solutions through use of underlying technology, a variety of features, usability, acceptability by end users and of course ease of deployment and upkeep. By use of industry standards, the present invention shows how an organization can go from taking their backend and paper forms to robust and powerful mobile applications in weeks rather than months without being tied into specific technologies and having the flexibility of easy portability.

With the use of an end-to-end solution like that disclosed by the present invention, an organization can eliminate any downfalls associated with using a smart client application approach due to its rapid deployment and ease of upgrade capabilities. An application can be developed by a non-technical user which would eliminate the need to hire anyone new with the appropriate skill set.

In the foregoing description, the method and apparatus of the present invention have been described with reference to specific examples. It is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A method of synchronizing a set of data resident in a mobile device as between the mobile device and a customer server, the method comprising the steps of:

instructing an application programming interface (API) resident on the mobile device to send a first communication with a set of data to the synchronization server;

versioning the set of data sent with the first communication by the synchronization server;

sending the first communication with the versioned set of data to an integration server;

redirecting the first communication with the versioned set of data from the integration server to the customer server;

processing the versioned set of data from the first communication in the customer server pursuant to a set of applied business rules for forms, surveys and applications;

creating a second communication by the customer server, with data on the basis of the processing of the first communication with the versioned set of data pursuant to the set of applied business rules for forms, surveys and applications;

sending the second communication with data from the customer server to the integration server;

sending the second communication with data from the integration server to the synchronization server;

versioning the set of data sent with the second communication by the synchronization server;

sending the second communication with the versioned set of data to the application programming interface;
synchronizing the set of data resident in the mobile device according to the second communication with the versioned set of data when there is continuous connectivity between the mobile device and the customer server, and
synchronizing the set of data resident in the mobile device according to the first communication with the versioned set of data when there is discontinuous connectivity between the mobile device and the customer server when connectivity is restored.

2. The method according to claim 1, further comprising the step of:
embedding the application programming interface (API) on the mobile device.

3. The method according to claim 1, further comprising the step of:
storing the data of the first communication on a database tied to the customer server.

4. The method according to claim 1, further comprising the step of:
storing the data of the second communication in a memory resident on the mobile device.

5. The method according to claim 1, further comprising the step of:
displaying the processed set of data on the mobile device.

6. The method according to claim 1, wherein the processing of the set of data in the customer server pursuant to a set of applied business rules allows the mobile device to perform a specific task.

7. The method according to claim 6, wherein the specific task includes at least one of a price checking capacity, a product description retrieval capacity and an inventory management capacity.

8. The method according to claim 1, comprising the further step of:
sending from the synchronization server an instruction to "pull" the first communication with data from the mobile device thereby allowing the processing of the set of data in the customer server pursuant to a set of applied business rules.

9. The method according to claim 1, comprising the further step of:
sending from the synchronization server an instruction to "push" the second communication with data to the mobile device thereby allowing synchronizing the set of data as between a mobile device and a customer server.

10. The method according to claim 1, comprising the further step of:
the synchronization server conducts conflict resolution as between a plurality of sets of data resident on the mobile device and the customer server.

* * * * *